United States Patent
Anderson et al.

(10) Patent No.: US 9,548,509 B2
(45) Date of Patent: Jan. 17, 2017

(54) POLYOXOMETALATE ACTIVE CHARGE-TRANSFER MATERIAL FOR MEDIATED REDOX FLOW BATTERY

(71) Applicant: Sandia Corporation, Albuquerque, NM (US)

(72) Inventors: Travis Mark Anderson, Albuquerque, NM (US); Nicholas Hudak, Albuquerque, NM (US); Chad Staiger, Albuquerque, NM (US); Harry Pratt, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 297 days.

(21) Appl. No.: 14/569,033

(22) Filed: Dec. 12, 2014

(65) Prior Publication Data

US 2015/0280259 A1     Oct. 1, 2015

Related U.S. Application Data

(60) Provisional application No. 61/970,160, filed on Mar. 25, 2014.

(51) Int. Cl.
*H01M 8/18*     (2006.01)
*H01M 8/20*     (2006.01)
(Continued)

(52) U.S. Cl.
CPC ............ *H01M 8/20* (2013.01); *C08K 5/00* (2013.01); *H01M 8/04186* (2013.01); *H01M 8/188* (2013.01); *Y02T 90/32* (2013.01)

(58) Field of Classification Search
None
See application file for complete search history.

(56) References Cited

U.S. PATENT DOCUMENTS 5,366,824 A    11/1994   Nozaki et al.
8,722,226 B2    5/2014   Chiang et al.
(Continued)

OTHER PUBLICATIONS

Huang, et al., "Reversible Chemical Delithiation/Lithiation of LiFePO4: Towards a Redox Flow Lithium-Ion Battery," Phys. Chem. Chem. Phys., vol. 15, 2013, pp. 1793-1797.
(Continued)

*Primary Examiner* — Miriam Stagg
*Assistant Examiner* — Wojciech Haske
(74) *Attorney, Agent, or Firm* — Medley, Behrens & Lewis, LLC; Aman Talwar

(57) ABSTRACT

Redox flow batteries including a half-cell electrode chamber coupled to a current collecting electrode are disclosed herein. In a general embodiment, a separator is coupled to the half-cell electrode chamber. The half-cell electrode chamber comprises a first redox-active mediator and a second redox-active mediator. The first redox-active mediator and the second redox-active mediator are circulated through the half-cell electrode chamber into an external container. The container includes an active charge-transfer material. The active charge-transfer material has a redox potential between a redox potential of the first redox-active mediator and a redox potential of the second redox-active mediator. The active charge-transfer material is a polyoxometalate or derivative thereof. The redox flow battery may be particularly useful in energy storage solutions for renewable energy sources and for providing sustained power to an electrical grid.

19 Claims, 4 Drawing Sheets

(51) Int. Cl.
C08K 5/00 (2006.01)
H01M 8/04 (2016.01)

(56) References Cited

U.S. PATENT DOCUMENTS

| | | | |
|---|---|---|---|
| 2009/0317668 A1* | 12/2009 | Creeth | H01M 4/8605 |
| | | | 429/417 |
| 2010/0141211 A1 | 6/2010 | Yazami | |
| 2013/0071702 A1* | 3/2013 | Longman | B01F 3/04262 |
| | | | 429/50 |
| 2014/0030623 A1 | 1/2014 | Chiang et al. | |
| 2014/0154546 A1 | 6/2014 | Carter et al. | |
| 2014/0178735 A1 | 6/2014 | Wang et al. | |

OTHER PUBLICATIONS

Tan, et al., "Synthesis and Characterization of Biphenyl-Based Lithium Solvated Electron Solutions," The Journal of Physical Chemistry B, vol. 116, 2012, pp. 9056-9060.

Blinco, et al., "Experimental and Theoretical Studies of the Redox Potentials of Cyclic Nitroxides," J. Org. Chem., vol. 73, Issue 17, 2008, pp. 6763-6771.

Lever, A. B. P., "Electrochemical Parametrization of Metal Complex Redox Potentials, Using the Ruthenium(III)/Ruthenium(II) Couple to Generate a Ligand Electrochemical Series," Inorganic Chemistry, vol. 29, Issue 6, 1990, pp. 1271-1285.

Masui, et al., "Correlations Between the Ligand Electrochemical Parameter, EL(L), and the Hammett Substituent Parameter, σ," Inorganic Chemistry, vol. 32, Issue 10, 1993, pp. 2199-2201.

* cited by examiner

POLYOXOMETALATE ACTIVE CHARGE-TRANSFER MATERIAL FOR MEDIATED REDOX FLOW BATTERY

CROSS-REFERENCE TO RELATED APPLICATION

This application claims the benefit of priority of U.S. Provisional Patent Application Ser. No. 61/970,160, filed Mar. 25, 2014, and entitled "POLYOXOMETALATE ELECTRON SPONGE CATHODES FOR HIGHER CAPACITY LITHIUM ION BATTERIES," the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Global energy consumption is projected to significantly increase by mid-century, and this increased need may be partially met through use of renewable energy sources. Due to the intermittent nature of some of these renewable energy sources, such as wind and solar, it is desirable to incorporate compatible large-scale energy storage devices into the energy grid. Use of such grid storage is also being driven by the evolving features of the electrical grid, such as green grid technology, smart grid technology, and a distributed structure of the grid, as well as by other technological developments including electric vehicles.

In conventional flow batteries, electrolyte (e.g., catholyte and anolyte) that includes one or more dissolved electroactive species oftentimes flows through an electrochemical cell that reversibly converts chemical energy to electricity. The electroactive components are dissolved in a solvent rather than being in a solid state in such flow batteries. The electrolyte is stored external to the cell (e.g., in tanks), and can be pumped through the cell or fed into the cell via gravity. Thus, spent electrolyte in the cell is recovered for re-energization and replaced with electrolyte from the external tanks Conventionally, charge is stored and drawn from the electrolyte solution. While flow batteries may be charged and discharged without degradation of performance, conventional flow batteries commonly have low energy densities and include costly materials.

There are some recent attempts to combine the infrastructure of lithium-ion batteries with the advantages of redox flow batteries (RFBs). In one example, intercalation materials and conductive additives were made into suspensions that circulate between the electrochemical cell and external storage tanks. However, the parasitic energy losses associated with pumping the highly viscous materials and the inherent deficiencies of the intercalation materials makes this system impractical for large-scale energy storage. Previous research has also reported lithium-ion RFB systems where an aqueous iron-based cathode was separated from a metallic lithium anode by a solid lithium-ion conductor, and it was pumped to flow through the cathode in a loop. Both of these systems have decreasing voltage with charge cycling, low capacity, and limited stability of the solid lithium-ion conductor. There is also a report of a battery that is a hybrid of these two systems (intercalation cathode and lithium metal anode), but it has very low loading of the cathode material and therefore very low energy density. In addition, all of the non-aqueous studies reported have energy densities more than an order of magnitude lower than state-of-the-art aqueous RFB chemistries.

SUMMARY

The present disclosure is directed to a mediated redox flow battery that utilizes mediator molecules that are designed on the molecular level to possess redox potentials for obtaining high round-trip energy efficiency and high energy density. In mediated flow batteries, mediator molecules, or charge carriers, participate in the electrochemical electrode reactions at the cell or stack while the energy is stored in immobile charge-transfer compounds (also known as charge-storage compounds) located in containers (e.g. reactors, tanks, or vessels) separate from the cell or stack. The charge-transfer compounds do not react directly on the electrodes but react with one or more mediators, which in turn react in the electrode chamber in the cell. Thus, solid materials with high charge-storage capacity per unit mass or volume can be used in the mediated flow battery system without having to flow through the electrode chamber in the cell.

On each "side" of the battery (positive or negative), a solid charge-transfer compound is stored as a packed bed in a container through which a solution of mediator molecules flow. The charge-transfer compound at each side is oxidized and reduced by the mediator solution passing through the container. The mediator solution on each side flows from the respective container to the corresponding electrode chambers of the cell, where the mediator is electrochemically reduced or oxidized.

With proper design, mediated flow batteries can possess the main advantages of both flow batteries (the ability to scale energy content and power independently) and solid phase charge store, e.g. lithium batteries (high energy density). However, a mediated flow battery has lower voltage efficiency and lower discharge voltage than a conventional battery made of the same charge-transfer materials because of the additional voltage drops required by mediation. Limiting these losses in efficiency and voltage is a challenge for mediated flow batteries.

In a general embodiment, the present disclosure provides a redox flow battery including a half-cell electrode chamber coupled to an electrode. A separator is coupled to the half-cell electrode chamber. The half-cell electrode chamber comprises a first redox-active mediator and a second redox-active mediator. The first redox-active mediator and the second redox-active mediator are circulated through the half-cell electrode chamber into an external container. The container includes an active charge-transfer material. The active charge-transfer material has a redox potential between a redox potential of the first redox-active mediator and a redox potential of the second redox-active mediator. The active charge-transfer material is a polyoxometalate or derivative thereof. The redox flow battery may be particularly useful in energy storage solutions for renewable energy sources and for providing sustained power to an electrical grid.

Additional features and advantages are described herein, and will be apparent from the following Detailed Description and the figures.

DETAILED DESCRIPTION

Figure 1:
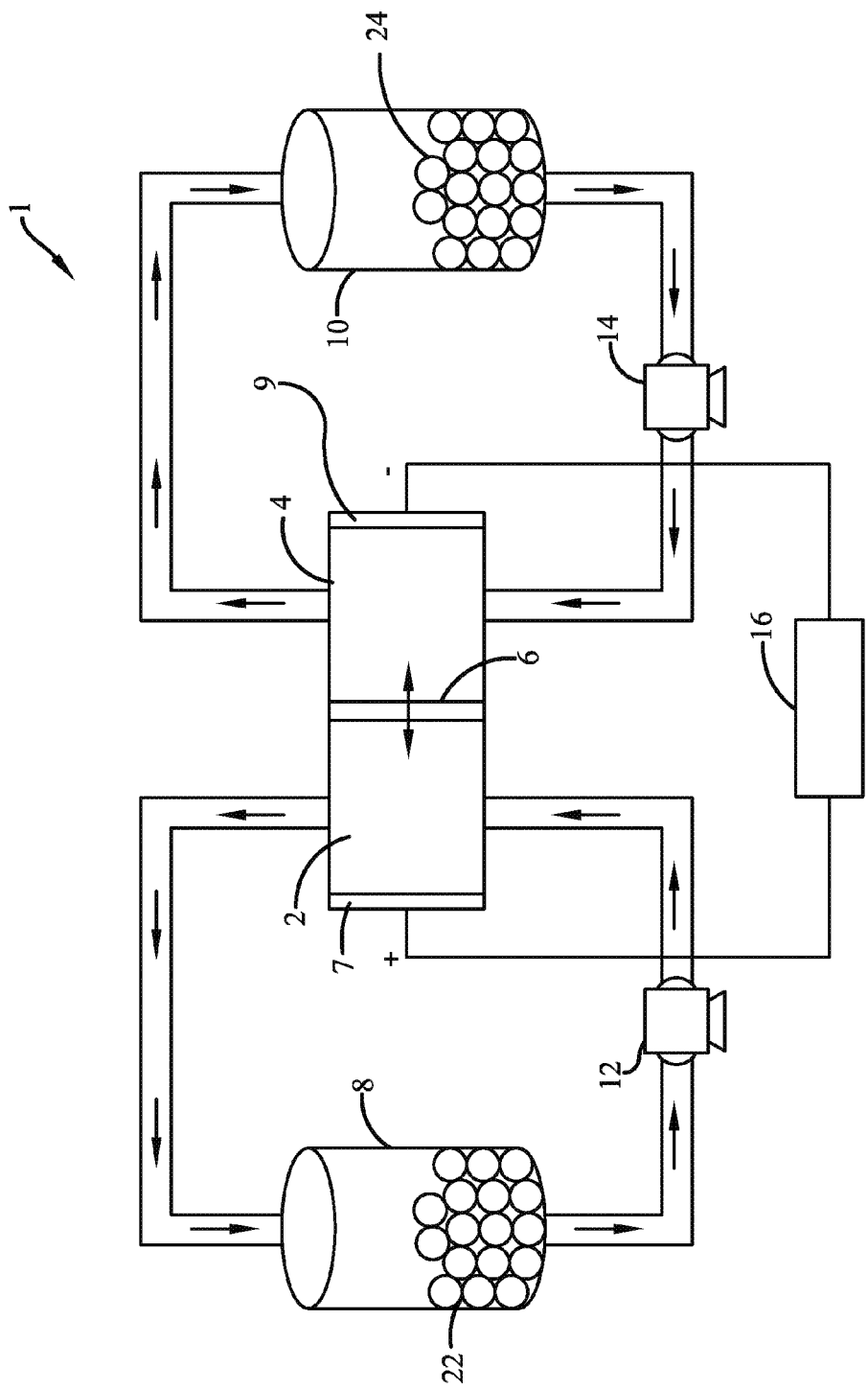
FIG. 1 is a diagram of an exemplary redox flow battery.

The present disclosure is generally directed to new lithium-based systems for rechargeable batteries with higher energy density and improved performance and safety for both grid storage and electric vehicle applications. The drive towards higher energy density, longer life, and lower cost batteries has exposed limitations in current technologies. This includes capacity of charge-storage materials that do not meet the cost and performance targets for utility markets, and the need for increased renewables integration. Current insertion electrode materials cannot meet these requirements because of the limited amount of lithium in their stoichiometry, and conversion materials suffer from high resistance leading to voltage loss (hysteresis in the charge and discharge voltage traces). In order to address these concerns, it is proposed to develop multivalent polyoxometalates (POMs) as energy-storage materials (e.g. lithium ion storage) and associated redox shuttles (redox mediators) for fast electron transfer. The proposed system leverages expertise in electrolyte development and battery prototyping for the demonstration of a hybrid flow battery based on lithium-ion and flow battery technologies.

In an embodiment, the approach presented here allows utilizing the high voltage and energy density of systems such as lithium-ion systems with the uncoupled power and energy capabilities of redox flow batteries, while obtaining high capacity through the use of a new family of solid phase electron sponge charge-transfer materials and redox mediators to simultaneously deliver high performance. An electron sponge functionally acts to stably accept electrons without decomposing.

The technology described herein pushes the limits of current technologies in both lithium batteries and redox flow batteries, utilizing advanced organic and inorganic energy storage materials, such as an electron sponge that allows for the combination of the attributes of multivalent materials with lithium-ion infrastructure. The volumetric capacity of charge-storage materials for conventional, state-of-the-art redox flow batteries is limited by the solubility of active compounds in aqueous solutions. This limits the state-of-the-art volumetric capacity to 80 Ah/L (ampere-hours per liter). Polyoxometalate (POM) electrodes exhibit several important properties for use as charge-transfer compounds in both lithium-ion and flow battery technologies including: (1) The POM electrodes have the ability to react with up to 24 electrons per molecule (two per metal center) at potentials between 1.5 and 5 volts, such as 2 to 3.5 volts, or 3 to 4 volts, verses Li/Li+ without decomposition. (2) The POM electrodes have the ability to approximately double the cathode capacity of current lithium technology (up to 353 mAh/g, such as 200 to 350 mAh/g, or 170 to 250 mAh/g, versus 160 mAh/g), (3) where POMs are used in their solid form, their volumetric capacities can range from 90 Ah/L to 400 AW/L, such as 200 to 350, or 150 to 300 AW/L, and when multiplied by a 2×advantage in voltage over aqueous systems, this embodiment can achieve up to 10×the volumetric energy density of state-of-the-art flow batteries. (4) The POM system described herein also has excellent electrochemical reversibility and thermal stability.

Furthermore, the technology described herein provides methodologies for tuning battery cell characteristics to meet the demands of various applications. High cell potential and system energy density can be achieved by selecting cathode materials with high potential and anode materials with low potential. The materials and modifications described herein allow for reaching exceptionally high and low potentials, as well as charge density, particularly for a redox flow battery. The technology described herein also allows the voltage of a cell to be tuned for applications requiring lower voltages.

With reference to FIG. 1, in a general embodiment, a mediated redox flow battery 1 includes a polyoxometalate as the charge-transfer material. The redox flow battery includes two half-cell electrode chambers—a cathode cell chamber 2 and an anode cell chamber 4. The two half-cell chambers 2, 4 are coupled to and separated by an ion exchange membrane 6. At the terminal end of the cathode cell chamber is a cathode electrode 7 and at the terminal end of the anode cell chamber 4 is an anode electrode 9. Two electrolyte and mediator solutions flow through the half-cell chambers 2, 4 (e.g., electrolyte and mediator flows through the cathode cell chamber 2 and electrolyte and mediator flows through the anode cell chamber 4). Thus, a first electrolyte and mediator flows through the cathode cell chamber 2 and a second electrolyte and mediator flows through the anode cell chamber 4.

The flow battery 1 further includes a cathode container 8 and an anode container 10 in which additional amounts of the first and second mediator and the first and second electrolyte are stored and circulated. In the mediated redox flow battery 1, the cathode and anode containers 8, 10 also contain a charge-transfer material 22, 24, respectively, an active cathode 22, and an active anode 24. The charge-transfer material 22, 24, is depicted as a bed of solid particulate or spherical bead material, but any solid form could be used. The increased surface area of the particulate material provides better access to reactive surfaces of the solid for redox reactions with the mediators. The high density of the solid material allows for improved charge density over storing charge in a liquid or gel phase.

Moreover, in the embodiment of FIG. 1, the mediated redox flow battery 1 includes a cathode pump 12 and an anode pump 14. The cathode pump 12 causes the liquid electrolyte and first and second mediators to flow from the cathode container 8 into the cathode cell chamber 2, where the electrolyte and mediators can flow through the cathode cell chamber 2 and return to the cathode container 8. Similarly, the anode pump 14 can cause the electrolyte and mediators to flow from the anode container 10 into the anode cell chamber 4, where the electrolyte and mediators can flow through the anode cell chamber 4 and return to the anode container 10. In alternative embodiments, the components may be arranged to provide gravimetric flow of the mediators and electrolyte.

Furthermore, an electrical circuit is completed through the cathode electrode 7, cathode cell chamber 2, ion exchange membrane 6, anode cell chamber 4 and anode electrode 9 through an electrical component 16. If the electrical component 16 is an electrical power source, then the mediated redox flow battery 1 can be charged. If the component 16 is an electrical power load, then the mediated redox flow battery 1 can be discharged. While the voltages of the cells may be tuned in the manner explained herein, the voltage of the battery stack may also be adjusted by adding cells in a conventional manner.

Figure 2:
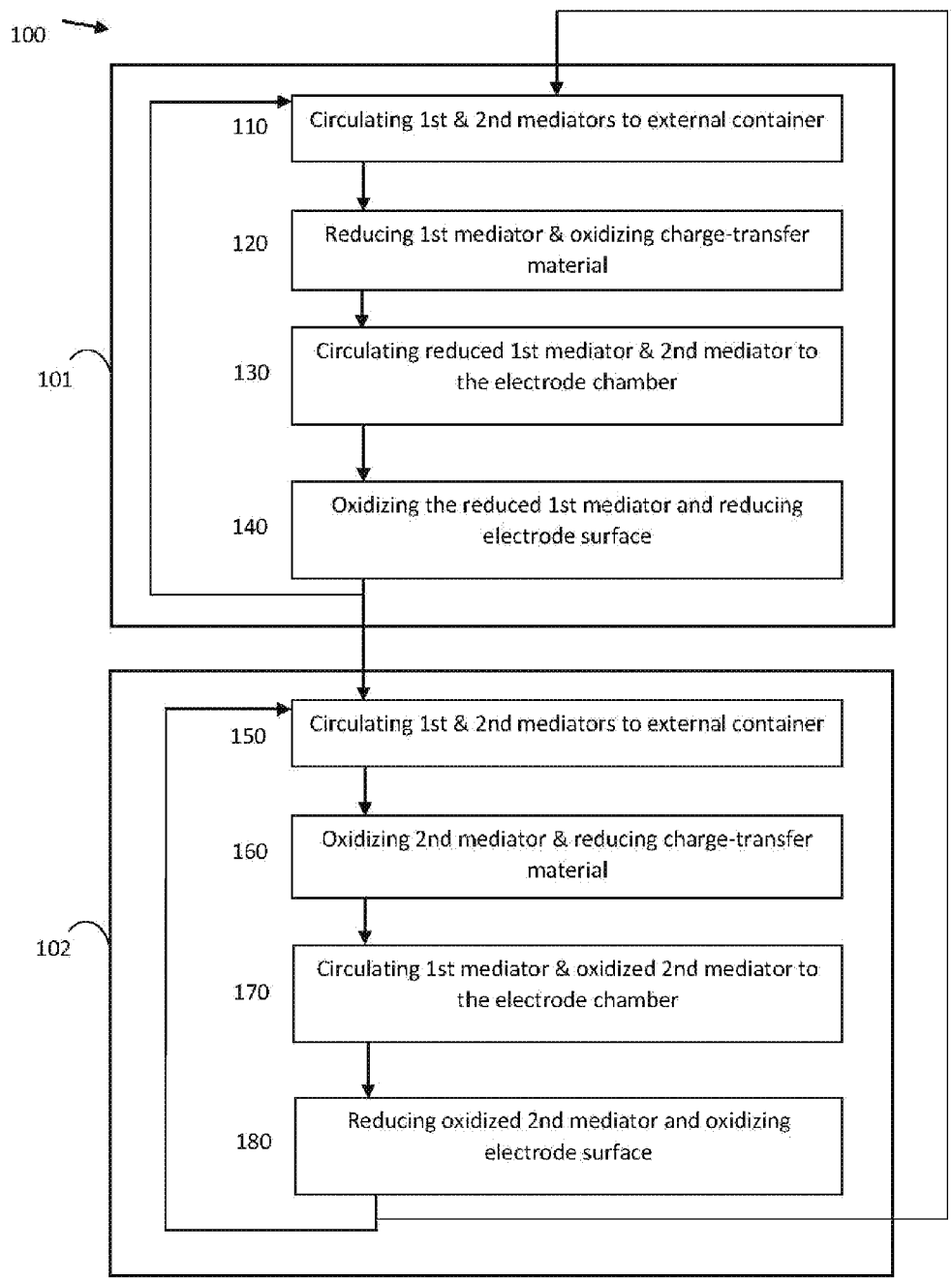
FIG. 2 shows an exemplary methodology for storing and releasing energy in a mediated redox flow battery.

Having described the general structure and operative contents of the exemplary mediated redox flow battery 1, further details of the components and the process of storing and releasing energy will now be described. In an embodiment, a method of storing and releasing electrical energy 100 is depicted in FIG. 2. The methodology is performed by charging or discharging a battery by a load or a charging source and mediating electrochemical reactions in the battery. The methodology 100 of FIG. 2 is generalized so that it may apply to either a cathode or an anode half-cell of a redox mediated flow battery. The steps in the top box 101 show a first charge/discharge cycle and the steps in the bottom box 102 show a second charge/discharge cycle. In the case that the methodology 100 is applied to a cathode half-cell, the steps in the top box 101 illustrate a charge cycle, and the steps in the bottom box 102 illustrate a discharge cycle. In the case that the methodology 100 applies to an anode half-cell, the steps in the top box 101 illustrate a discharge cycle, and the steps in the bottom box 102 illustrate a charge cycle.

It should be recognized that although the process is described in terms of steps, each step within each box 101, 102, may be performed simultaneously in a system that is designed to continuously circulate the first and second redox-active mediators. The description of the steps follows a particular first and second redox-active mediator as a way to describe the process, but in practice there are numerous mediator molecules circulating throughout the electrode chamber and the external container at all times and different speeds, and a particular first and a particular second mediator may not in reality circulate together. One of skill in the art will understand this, and the description and claims should be read with this in mind. As such, the terms first redox-active mediator and second redox active mediator may be read to mean a first type of mediator and a second type of mediator, wherein the charge-transfer material has a redox potential between the redox potential of the first redox-active mediator and a redox potential of the second redox-active mediator.

Step 110 comprises circulating a first redox-active mediator and a second redox-active mediator from a half-cell electrode chamber into an external container that includes a charge-transfer material. In an embodiment, the first redox-active mediator is already in a charged state, i.e. oxidized state. As described above, the charge-transfer material may be in the form of a solid and in a particulate packed bed through which the mediators flow.

Step 120 comprises reducing the first redox-active mediator in the half-cell external container through a redox process with the charge-transfer material. The charge-transfer material is correspondingly oxidized. As a result of this process the reduced first mediator is now in its parent non-charged form. In this step 120, the second redox-active mediator is inactive and does not react.

Step 130 comprises circulating the reduced first redox-active mediator and the second redox-active mediator from the external container to the half-cell electrode chamber.

Step 140 comprises oxidizing the reduced first redox-active mediator and reducing the electrode surface in the half-cell electrode chamber. Again, in this step, the second redox-active mediator is inactive and does not react. If this step 140 is performed on the anode side, the electrode surface is being reduced, and the battery is discharging. If this step 140 is performed on the cathode side, the cathode electrode surface is being reduced, and the battery is charging.

If the first charge/discharge cycle of box 101 is continued, the methodology 100 begins again at step 110 with the first and second redox-active mediators being circulated from the electrode chamber in the stack to the external container. This cycle may be repeated until the charge-transfer material is either fully oxidized or reduced. The methodology may also stop or pause at step 140, for example, if it is desired to only charge the half-cell and store the energy for later use or discharge the battery without immediately recharging.

If the charge/discharge cycle is changed from the first to the second state, e.g. to a charge state for an anode, or to a discharge state for a cathode, the methodology 100 continues to step 150 in the steps of the bottom box 102. The steps in the bottom box 102 differ in that the second redox-active mediator is undergoing oxidation-reduction reactions with the charge-transfer material and the electrode surface.

Step 150 comprises circulating a first redox-active mediator and a second redox-active mediator from the half-cell electrode chamber into the external container that includes the charge-transfer material. The second redox-active mediator may already be in a charged, i.e. reduced state.

Step 160 comprises oxidizing the second redox-active mediator in the half-cell electrode chamber through a redox process with the charge-transfer material. The charge-transfer material is correspondingly reduced in the redox process of this step 160. In addition, in this step 160, the first redox-active mediator is inactive and does not react. If, for example, the half-cell is an anode and the charge-transfer material was fully discharged, and the system is in now in a charge cycle, the charge-transfer material will be reduced by the second mediator, thereby charging the battery.

Step 170 comprises circulating the first redox-active mediator and the oxidized second redox-active mediator from the external container to the half-cell electrode chamber. In an embodiment, as a result of this process the oxidized second mediator has been oxidized back to its parent non-charged form.

Step 180 comprises reducing the oxidized second redox-active mediator and oxidizing the electrode surface in the half-cell electrode chamber. Again, in this step, the first redox-active mediator is inactive and does not react. If this step 180 is performed on the cathode side, the electrode surface is being oxidized, and the battery is discharging. Alternatively, if this step 180 is performed on the anode side, the electrode surface is being reduced and the battery is charging.

If the second charge/discharge cycle of box 102 is continued, the methodology 100 continues at step 150 with the first and second redox-active mediators being circulated to the external container. This cycle may be repeated until the charge-transfer material in the external container is either fully oxidized or reduced. The methodology may also stop or pause after step 180, for example, if it is desired to only charge the half-cell and store the energy for later use, or discharge the half-cell without immediately recharging or only partially discharging.

If the charge/discharge cycle 102 is changed from the second to the first state, e.g. to a discharge state for an anode, or to a charge state for a cathode, the methodology 100 continues to step 110 in the steps of the top box 101. The charge and discharge cycles may be continued for both anode and cathode for numerous cycles. The limiting factors in the number of charge-discharge cycles that can be applied are the abilities of each battery component (charge-transfer materials, mediators, solvents, membrane, electrode support, or hardware) to resist chemical breakdown or phase transition after long-term aging or exposure to abusive conditions.

The ion-exchange membrane is a selective barrier that allows passage of certain ionic species to balance charge and complete the electrical circuit while preventing mediator molecules from passing through. During battery discharge, while a cathode mediator is being reduced and an anode mediator is being oxidized, the charge may be balanced by the transport of lithium ions through the membrane from the anode side to the cathode side. Alternatively, the charge may be balanced by the transport of anions from the supporting electrolyte, such as hexafluorophosphate, from the cathode side to the anode side. During battery charge, while a cathode mediator is being oxidized and an anode mediator is being reduced, the charge may be balanced by the transport of lithium ions through the membrane from the cathode side to the anode side. Alternatively, the charge may be balanced by the transport of anions from the supporting electrolyte, such as hexafluorophosphate, from the cathode side to the anode side. Optimum performance will be achieved if the membrane prevents any mediator molecules from passing through from one side of the cell to the other while allowing passage of ions from the supporting electrolyte.

One of skill in the art will appreciate that the described process for anode and cathode half-cells may be paired together to form a complete mediated redox flow battery process with both half-cells working in conjunction and the electrode chambers being electrically coupled through, e.g. a separator membrane that functions to allow electrical charge to pass through via ion transport but not to allow the mediators themselves to pass through.

Having described the general structure and process of an embodiment of the mediated redox flow battery, further details on the materials and properties of the components are provided below. Unlike a typical battery or even a typical flow battery, the material that stores charge, or the charge-transfer material, is housed completely in the exterior container instead of reacting at the electrode surface. The charge-transfer material functions to store charge and participate in redox reactions with the mediators that flow into the electrode chambers of the battery cells.

In an embodiment, polyoxometalates (POMs) are used as the charge-transfer compounds (i.e. charge-transfer materials) on one or both sides of the battery. In an embodiment, the POM may be used as both the anode charge-transfer material and cathode charge-transfer material. In an embodiment, the POM material only be used as one of the active anode or cathode. For example, in one configuration the battery may include a POM cathode charge-transfer material and a lithium anode. The voltage of the POM is sufficiently tunable through the process described herein that two different POMs could be synthesized that differ sufficiently in voltage to serve as both cathode and anode charge-transfer material.

Each POM in its native form may be reversibly reduced by lithium ions, protons, or other types of ions and oxidized back to its native form. The lithium ions serve to balance the charge on the POM as it acquires electrons. A primary limiting factor in lithium battery technology stems from the use of cathode materials with limited stoichiometric amounts of lithium. However, POMs are a genus of transition metal-oxygen clusters with diverse and alterable sizes, shapes, charge densities, and reversible redox potentials. In the solid state, POMs can accept or donate, for example, two electrons per metal center, which may translate to very high electron storage densities, up to 32 electrons per molecule, such as 4 to 30, or 16 to 28 electrons per molecule. As such, POMs may be said to function as a molecular sponge. POMs are also stable to decomposition due to strong ion pairing with cations such as lithium and the subsequent formation of a stabilizing dielectric field. Although the POMs will not be in direct electrical contact with the electrodes, their redox potentials will determine those of the mediators and of the electrochemical cell itself.

Examples of POM materials include: Lindqvist hexamolybdate, decavanadate, paratungstate, $Mo^{36-}$polymolybdate, the Strandberg structure ($HP_2Mo_5O_2^{34-}$), Keggin structure POM ($XM_{12}O_{40}^{n-}$), Dawson structure POM ($X_2M_{18}O_{62}^{n-}$), Anderson structure POM ($XM_6O_{24}^{n-}$), Allman-Waugh structure POM ($XM_9O_{32}^{n-}$), Weakley-Yamase structure POM ($XM_{10}O_{36}^{n-}$), and the Dexter-Silverton structure POM ($XM_{12}O_{42}^{n-}$), wherein M is the transition metal and X is the heteroatom.

Examples of the transition metal in the POM include vanadium, molybdenum, tungsten, niobium, tantalum, cobalt, cerium, nickel. In an embodiment, the transition metal includes those with +1 to +7 oxidation states, such as +2 to +5, or those of Group 5 and Group 6. In an embodiment, the transition metals exclude the lanthanide and actinide series. Heteroatoms may also be included in the POM molecule, such as, e.g., phosphorous, arsenic, and silicon.

The high amount of charge transferred per molecule equates to higher specific capacity compared to the other types of compounds (e.g., metal oxides, phosphates, vanadates, titanates, metals, alloys, carbon-based compounds, conducting polymers, sulfides, or halides).

The redox potential of the charge-transfer material at each side of the mediated flow battery will determine the battery voltage and the desired redox potentials of each mediator. For many applications, it is desirable for the charge-transfer compound for the positive side of the battery to have as high a redox potential as possible within the stability range of the electrolyte solution used. Similarly, for many applications, the charge-transfer compound for the negative side of the battery should have as low a redox potential as possible within the stability range of the electrolyte solution used. These two requirements will maximize cell voltage and thus energy density. In other embodiments, it may be desirable to tune the cell voltage to a desired less than maximum voltage.

A challenge with POM and derivatives of POM materials are sloping potential profiles that could prevent the consistent and effective electron transfer between the mediator and the POM to achieve the maximum capacity on each side of the cell. In addition to tailoring the redox potential of the POM, this concern can be addressed by adding an additional metal such as vanadium into the POM structures, such as deca-tungstate and deca-molybdate. The additional metal may substituted for a metal in the POM structure, and may be a main group metal, transition metal, lanthanide, or actinide metal. In an embodiment, the metal is an early transition metal, e.g. 3B, 4B, 5B, or 6B, in its highest oxidation state. This modification would be expected to flatten the voltage profiles by enhancing ion pairing with lithium. In addition, this is expected to limit leaching of the POM and increase conductivity by increasing the charge density of the cluster.

To tune the potential of the POM material, the chemical structure can be modified by systematic ligand or functional group substitutions, such as, for example substitution of a terminal oxygen on the POM for a methoxy group. It could also be an elemental transition metal substitution, such as a substitution of vanadium for iron. This may be done, for example, to achieve higher potential for cathode materials, e.g. addition of vanadium, and lower potential for anode materials, e.g. addition of tungsten. As additional substitutions or replacements are conducted on the POM the effect of the added or substituted atom or group on the potential is greater.

In an embodiment, POMs are selected that are smaller (e.g., about 50%, such as the Lindqvist structure). This functions to decrease the molecular weight of the POM material and improve energy capacity.

In an embodiment, only one side of the mediated redox flow battery cell is a mediated redox flow half-cell. In an embodiment, only one side of the mediated redox flow battery cell uses POM as the charge-transfer material. In such an embodiment, the other side may use materials such as, for example, metal oxide, phosphate, vanadate, titanate, metal, alloy, carbon-based compound, conducting polymer, nitride, sulfide, or halide.

The stack electrodes, (cathode and anode), in an exemplary mediated redox flow battery cell are not active participants in charge storage but act as charge conducting materials that react with the mediators to facilitate oxidation and reduction of the mediator. In an embodiment, the electrodes are a porous, high surface area material, such as carbon. The carbon may be selected to match desired applications, such as by varying porosity of the carbon. In an embodiment, the electrode is selected so that it will be inert, i.e., it will not chemically change upon reaction with either of the mediators or electrolyte, but it does participate in electron transfer in the redox process. In an embodiment, the electrodes may be loaded with catalyst to facilitate the charge exchange with the mediator and improve kinetics. Unlike a conventional battery, the stack electrodes of a redox flow battery do not function to store charge.

In the exemplary redox flow battery, the electrolyte is in a flowable liquid form or is dissolved in a flowable liquid solvent. The solvent or electrolyte should also be selected to dissolve the mediators used in the system. In an embodiment, the solvent is the electrolyte. Those of skill in the art can select conventional electrolytes and/or solvents to achieve these functions.

In an embodiment, a fully mediated flow battery system with a given chemistry should have a total of four mediator compounds, two for the positive electrode and two for the negative electrode. However, in an embodiment, a flow battery half-cell can be paired with a conventional or non-flowing half-cell to form a battery.

The first and second mediators function to shuttle charge to and from the anode or cathode charge-storage material in the container to the cell stack through a redox process described in further detail above. The charge is utilized in the electrical circuit in the cell stack in both a charge and discharge cycle.

The use of redox mediators provides certain features to the system. First, the mediators allow for the charge-transfer materials to be stored in the external tank instead of being transported between the external storage tank and the electrochemical cell. Second, the charge-transfer materials can be dense solids implemented in a packed bed arrangement, allowing for precise control of the electrode properties, higher energy density, and improved performance. Third, this technology avoids the energy-consuming task of pumping high viscosity charge-transfer materials.

However, a challenge with the mediated redox flow battery technology described herein is that each electrode (anode and cathode) requires two mediators, one with a redox potential just above that of the lithium-insertion material and another with the redox potential just below. This difference between the redox potentials of a mediator and its corresponding charge-transfer compound provides the driving force for the electron transfer in both charge and discharge cycles.

In the case of the positive electrode (i.e. cathode side), the mediator with redox potential just above that of the charge-transfer compound is utilized during battery charge, and the mediator with redox potential just below that of the charge-transfer compound is utilized during battery discharge. In the case of the negative electrode (i.e. anode side), the mediator with redox potential just below that of the charge-transfer compound is utilized during battery charge, and the mediator with redox potential just above that of the charge-transfer compound is utilized during battery discharge.

Improvements to system energy density and efficiency are realized by assembling a flow battery system where the difference between mediator potential and lithium-insertion potential is very small, e.g. only large enough to provide a driving force for electron transfer. In an embodiment, the redox potentials of the mediators for the positive or negative electrode are tuned to be within 200 mV of the redox potential of the corresponding charge-transfer compound (i.e., the charge-transfer material that is stored in the container). For example, the redox potentials of the mediators for the positive or negative electrode are tuned to be within 0.1 to 150 mV, or 10 to 100 mV of the redox potential of the corresponding charge-transfer compound. Thus, the extra voltage required by mediation during charge or discharge is minimized so that the round-trip voltage efficiency, discharge voltage, and effective energy content of the system are maximized.

Figure 3:
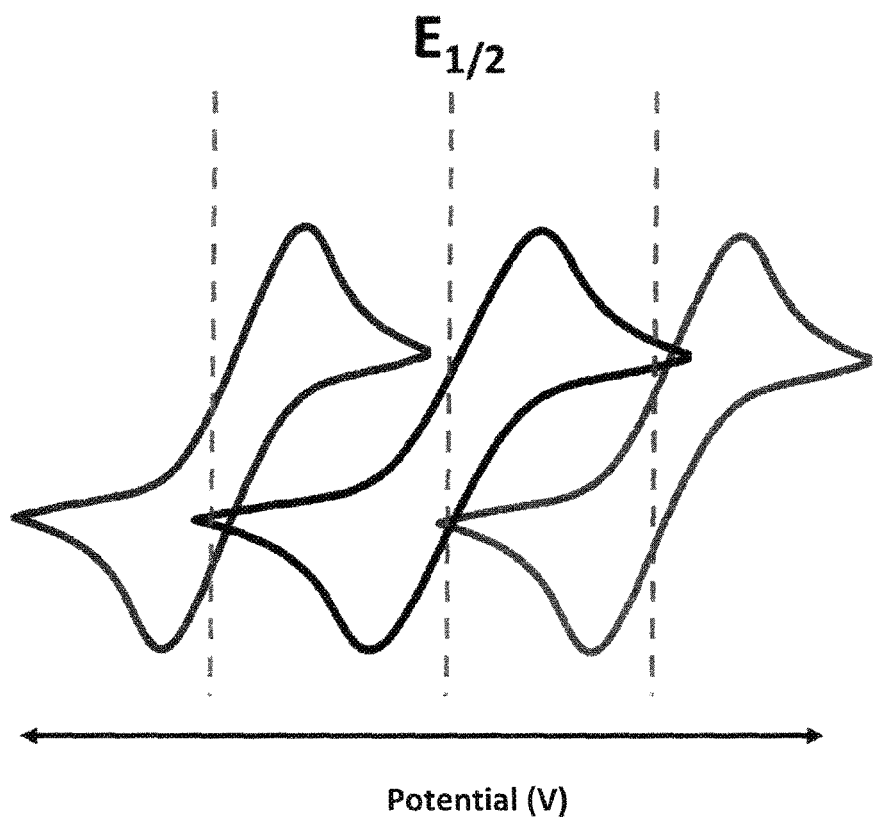
FIG. 3 is an exemplary cyclic voltammogram showing redox potential plots of first and second redox mediators bracketing a redox potential plot of a charge-transfer material.

To further illustrate the adjustment of the redox potentials of the components, reference is made to a cyclic voltammogram, such as the one shown in FIG. 3, which shows a plot of each of the charge-transfer material, the first redox-active mediator, and the second redox-active mediator as the redox flow battery is charged and discharged in a full cycle. It illustrates the redox reactions that occur in the container between the mediators and the packed bed.

In an embodiment, the cyclic voltammogram will show an area of 0.001% to 20%, such as, for example, 0.1% to 15%, or 1% to 10% of the charge-transfer material plot overlapping the first and second redox-active mediator plots. The percentage of overlap is based on the total area of the sum of all three of the charge-transfer material, the first redox-active mediator, and the second redox-active mediator.

As shown in FIG. 3, each of cyclic voltammogram plots of the mediators overlaps the cyclic voltammogram plot of the charge-transfer material in at least one location, such as two locations, one in the charge portion of the cycle and one in the discharge portion of the cycle. A minimal overlap of potentials provides the driving force for the oxidation and reduction reactions, but also prevents loss of energy during discharge, from driving potential down too far.

In an embodiment, electroactive organic compounds are prepared as the mediators to "redox match" (i.e. bracket the redox potential) with the charge-transfer materials of the anode or cathode. Within each family of organic compounds, the redox potential can be tuned through the addition of electron withdrawing or donating groups. By adding selected functional groups the cyclic voltammogram plots can be moved along the horizontal x-axis.

Figure 4:
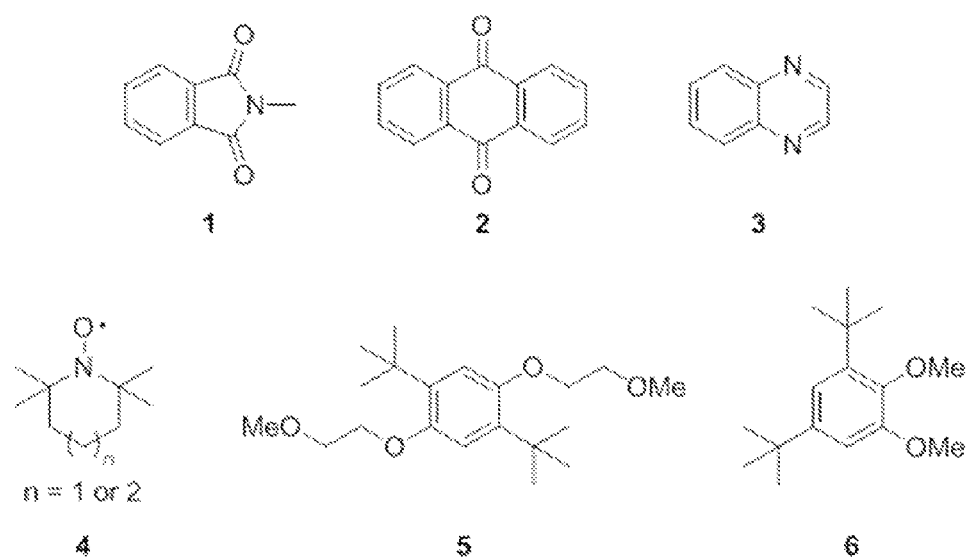
FIG. 4 shows exemplary molecular structural formulae for redox-mediator molecules.

In an embodiment, one or more electroactive organic molecules can be selected and prepared to "redox match" with the charge-transfer material. FIG. 4 shows exemplary molecules. Note the wide range of potentials from 1.9 V for N-methylphthalimide (formula 1), 2.3 V (formula 2), 2.6 V (formula 3), 3.5 V (formula 4 with a five membered ring), 3.9 V for a substituted hydroquinone ether (formula 5), and 3.7 to 4.3 V (formula 6) all with single electron redox potentials versus Li/Li$^+$. Compounds such as substituted hydroquinone ether (formula 5) and quinoxaline (formula 3) are compatible with lithium-ion battery processes. For example, a quinoxaline or a derivative thereof may be used on the cathode side as a mediator, and hydroquinone ether may be used as a mediator on the anode side.

In an embodiment, the first and second mediator molecules can be metal coordination complexes (also known as organometallic compounds) or redox-active organic molecules containing no metallic elements. In the case of metal coordination complexes, molecular design can follow the ligand-based approach in which various ligands are attached to the metal center to tune the redox potential of the mediators to a desired value. For further information on the chemistry of these ligand additions see Lever, "Electrochemical Parametrization of Metal Complex Redox Potentials, Using the Ruthenium(III)/Ruthenium(II) Couple To Generate a Ligand Electrochemical Series," Inorg. Chem. 29, 1271-1285 (1990), and Matsui and Lever, Correlations between the Ligand Electrochemical Parameter, $E_L$ (L), and the Hammett Substituent Parameter, σ," Inorg. Chem. 32, 2199-2201 (1993), which are incorporated by reference herein in their entirety.

In an embodiment, the same class of mediator may be used as the base compound for both the first and second mediator, but the mediators may be tuned by addition of functional groups to modify the redox potentials of the mediators so that they bracket the redox potential of the charge-transfer material they are used with. Alternatively, two separate classes of compounds may be used on the cathode or anode side to bracket the redox potential of the charge-transfer material.

For example, within each family of compounds, the redox potential can be further tuned through the addition of electron withdrawing or donating groups, such as, alkyl groups, or polar groups, such as, for example, carboxylic acid, amide, amine, or alkoxy groups. In an embodiment, the species of formulas 1-6 are substituted at the cyclic or aromatic ring structure by the electron withdrawing or donating groups. Other locations on the molecules may also be substituted, such as the nitrogen heteroatoms in the quinoxaline or phthalimide compounds.

In an embodiment, the electron withdrawing or donating groups are present and have the formula —$XR_n$, wherein X is O, S, or N. Each R is independently selected from a linear, branched, cyclic, aromatic alkyl group having 1-50 carbon atoms, or hydrogen, and R is optionally functionalized with a functional group including a halogen, O, S, or N; and n ranges from 0 up to a valence of 3. Independently selected means that if there is more than one R group, it need not be the same R group. Alternative electron withdrawing functional groups include, for example, —$NO_2$, —CN, —$CO_2R$, -halogens, halogenated hydrocarbons, such as —$CF_3$, —COH (aldehyde), —$SO_3R$, —$NH_{3-n}R_n$, and electron donating groups include, for example, —$O_2CR$, amide, —OR, —$NH_{2-m}R_m$, and saturated or unsaturated linear, branched, cyclic or aromatic alkyl groups, wherein R and n are as defined above, and m ranges from 0 to 2. These groups can be utilized to impart redox active behavior in an organic or to further tweak the redox potential of the "base structure."

For example, the aromatic rings of quinoxaline (formula 3) can be alkylated to varying degrees to access redox potentials ranging from 2.5 to 2.7 V. In another example, nitroxide derivatives corresponding to formula 4, which depicts a hetrocyclic ring with 5 or 6 carbon atoms can be modified to have redox potentials from 3.7 V to 4.3 V vs Li/Li$^+$. See e.g. Bottle et. al. J. Org. Chem., 2008, 73 (17), pp 6763-6771, which is incorporated herein by reference.

Factors governing selection of electron withdrawing or donating functional groups are whether they provide electrochemical reversibility and fast electron-transfer kinetics to the mediator. Systematic variation of functional groups to identify trends (i.e., Hammett type relationships) in electrochemical and physical properties may be used to find additional groups in accordance with these factors.

Not only may the electrochemical properties be manipulated with chemical functionalization, but physical properties, such as solubility in flow battery solvents, may also be favorably impacted as well. Highly soluble redox shuttles will decrease the footprint of the battery as well as the parasitic loads (e.g. pumping) associated with battery operation. The polar, non-ionic nature of the mediators shown in FIG. 4 should provide better solubility in traditional battery solvents such as ethylene carbonate compared to inorganic or organometallic mediators. Highly soluble redox mediators will decrease the footprint of the battery as well as the parasitic loads (e.g., energy required for pumping) associated with flow battery operation.

The separator or ion exchange membrane, should be inert to chemical reaction with any of the mediators, their charged radical derivatives, the solvent, and/or electrolyte in the system. In an embodiment, a cation conducting membrane is used separate the anode compartment from the cathode compartment. In another embodiment an anionic conducting membrane is used as the separator. In an embodiment the ion exchange membrane is a size selective material used to separate the compartments.

In an embodiment, the mediated redox flow battery disclosed herein can mitigate key concerns involving both performance and safety, of high capacity batteries. The battery of the present disclosure may be integrated into an electrical grid storage system, wherein, for example, an intermittent, but renewable source, such as wind-generated power, wave-generated power, solar power, or other power sources are used to charge the battery.

Prospective Example 1

A redox flow battery would be constructed with a polyoxometalate active material as a packed bed of powder stored in the container coupled to the cathode chamber and a lithium-insertion anode material stored in the container coupled to the anode chamber. Two sets of first and second electrochemically compatible organic redox shuttle mediators would also be included, one set bracketing the redox potential of the active cathode and one set bracketing the redox potential of the active anode. A pump would be set up to cause the mediators, along with electrolyte and solvent to flow from containers to the cell chambers.

Many associated materials can be used, including the well-characterized ion conducting membranes and electrolytes. The organic redox shuttles can be characterized using standard electrochemical techniques such as cyclic voltammetry and chronopotentiometry.

Further guidelines for the prospective example are summarized below.

The POMs should have long-term structural integrity under conditions of operation. A key variable to controlling stability is selecting POMs that span a wide range of charge densities. Stability can be enhanced by doping trace amounts of inert metals such as niobium The POMs should have essentially flat potential profiles. Mixed-addenda POMs may be utilized with asymmetric surface charge distribution that will facilitate lithium pairing by minimizing entropy concerns (i.e. surface organization).

For the anode container, conventional lithium storage materials may be used to good effect so long as appropriate mediators are selected and/or tailored to have the redox potentials as disclosed herein.

Poor physical properties and/or poor electrochemical stability of the organic shuttle molecules can be addressed by chemical functionalization of the organic redox shuttles.

Battery performance can be improved with a variety of conductive additives, binders, varying electrode properties (porosity, tortuosity), and varying types of separators. Catalysts may also be used to improve kinetics at the electrodes.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A redox flow battery comprising:
a half-cell electrode chamber coupled to an electrode, wherein the half-cell electrode chamber comprises a first redox-active mediator and a second redox-active mediator, wherein the first redox-active mediator and the second redox-active mediator are circulated through the half-cell electrode chamber into a container comprising an active charge-transfer material, wherein the active charge-transfer material comprises a redox potential between a redox potential of the first redox-active mediator and a redox potential of the second redox-active mediator, and wherein the active charge-transfer material is a polyoxometalate or derivative thereof; and
a separator coupled to the half-cell electrode chamber.

2. The redox flow battery of claim 1, wherein the active charge-transfer material comprises an additional metal to tune the redox potential of the active charge-transfer material.

3. The redox flow battery of claim 2, wherein the additional metal is selected from metals in group 3B, 4B, 5B, or 6B.

4. The redox flow battery of claim 1, wherein the first, second, or first and second redox-active mediator is selected from redox-active, electrochemically reversible, cyclic or heterocylic organic compounds.

5. The redox flow battery of claim 1, wherein the first, second or first and second redox-active mediator has a structure corresponding to one of formula 1-6 below:

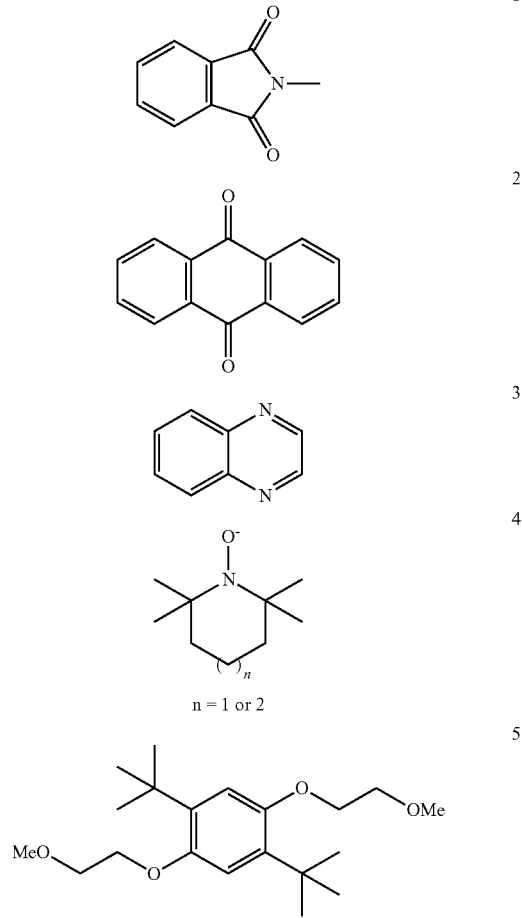

-continued

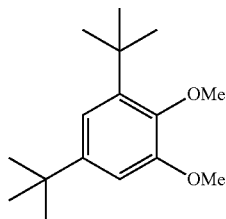
6 wherein the aromatic or cyclic structures in each formula are optionally substituted with electron withdrawing or donating groups.

6. The redox flow battery of claim 5, wherein the electron withdrawing or donating groups are present and are selected from the group consisting of:
groups having the formula —$XR_n$, wherein X is O, S, or N, wherein each R is independently selected from a linear, branched, cyclic, aromatic alkyl group having 1-50 carbon atoms, or hydrogen, and R is optionally functionalized with a functional group including a halogen, O, S, or N; and n ranges from 0 up to a valence of 3;
—$NO_2$, —CN, —$CO_2R$, -halogens, halogenated hydrocarbons, —$CF_3$, —COH, —$SO_3R$, —$NH_{3-n}R_n$, —$O_2CR$, amide, —OR, —$NH_{2-m}R_m$, and saturated or unsaturated linear, branched, cyclic or aromatic alkyl groups, wherein R and n are as defined above, and m ranges from 0 to 2; and combinations thereof.

7. The redox flow battery of claim 1, wherein the active charge-transfer material is in particulate form in a packed bed in the container.

8. The redox flow battery of claim 1, wherein the redox potential of the active charge-transfer material is within 200 mV of the redox potentials of the first and second redox-active mediators.

9. The redox flow battery of claim 1, wherein the volumetric capacity of the half-cell is 90 Ah/L to 400 Ah/L.

10. The redox flow battery of claim 1, wherein the half-cell electrode chamber is a cathode cell chamber and the electrode is a cathode, and the battery further comprising an anode.

11. The redox flow battery of claim 1, wherein the half-cell electrode chamber is an anode cell chamber and the electrode is an anode, and the battery further comprising a cathode.

12. The redox flow battery of claim 1, wherein a voltage of a single cell of the battery ranges from 1 to 5 volts.

13. A method for storing, releasing, or storing and releasing electrical energy by mediating electrochemical reactions in at least one of a first or second cycle, the method comprising:
in the first cycle:
circulating a first redox-active mediator and a second redox-active mediator through a half-cell electrode chamber into a container comprising an active charge-transfer material;
reducing the first redox-active mediator in the container and oxidizing the active charge-transfer material;
circulating the reduced first redox-active mediator and the second redox-active mediator through the container comprising the active charge-transfer material to the half-cell electrode chamber; and
oxidizing the reduced first redox-active mediator and reducing an electrode surface; and in the second cycle:
circulating the first redox-active mediator and the second redox-active mediator through the half-cell electrode chamber into the container comprising the active charge-transfer material;
oxidizing the second redox-active mediator in the container and reducing the active charge-transfer material;
circulating the first redox-active mediator and the oxidized second redox-active mediator through the container comprising the active charge-transfer material to the half-cell electrode chamber; and
reducing the oxidized second redox-active mediator and oxidizing the electrode surface in the electrode chamber, wherein the active charge-transfer material comprises a redox potential between a redox potential of the first redox-active mediator and a redox potential of the second redox-active mediator, and wherein the active charge-transfer material is a polyoxometalate or derivative thereof.

14. The method of claim 13, wherein the method is performed in a battery cell, and a single cell of the battery has a voltage of 1 to 5 volts.

15. The method of claim 13, further comprising selecting the first, second, or first and second redox-active mediator from those having a structure corresponding to one of formula 1-6 below:

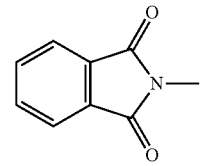
1

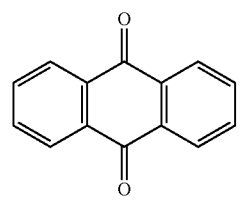
2

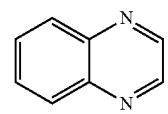
3

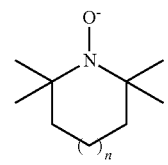
4 n = 1 or 2

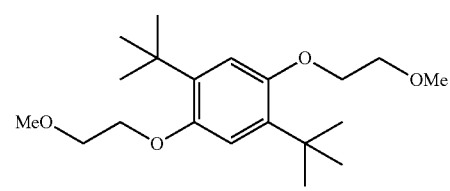
5

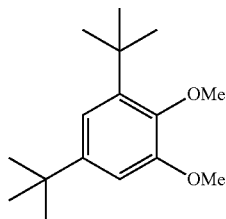

wherein the aromatic or cyclic structures in each formula are optionally substituted with electron withdrawing or donating groups.

16. A method of making a redox flow battery, the method comprising:
pre-determining a redox potential of a battery half-cell, the voltage being selected from a range of 0 to 5 volts versus $Li/Li^+$;
based on the predetermined redox potential of the battery half-cell, selecting an active charge-transfer material that comprises a polyoxometalate;
selecting a first redox-active mediator and a second redox-active mediator, the redox potential of the active charge-transfer material being between a redox potential of the first redox-active mediator and a redox potential of the second redox-active material; and
assembling the battery half-cell comprising:
a half-cell electrode chamber coupled to an electrode;
a separator membrane coupled to the half-cell electrode chamber;
a container coupled to the half-cell electrode chamber, the container comprising the active charge-transfer material; and
the half-cell electrode chamber comprising the first redox-active mediator and the second redox-active mediator.

17. The method of claim 16, wherein the half-cell electrode chamber is a cathode cell chamber and the electrode is a cathode, and further comprising assembling an anode cell chamber coupled to an anode electrode and the separator.

18. The method of claim 16, wherein the half-cell electrode chamber is an anode cell chamber and the electrode is an anode, and further comprising assembling a cathode cell chamber coupled to a cathode electrode and the separator.

19. The method of claim 16, wherein the electron withdrawing or donating groups are present and are selected from the group consisting of:
groups having the formula —$XR_n$, wherein X is O, S, or N, wherein each R is independently selected from a linear, branched, cyclic, aromatic alkyl group having 1-50 carbon atoms, or hydrogen, and R is optionally functionalized with a functional group including a halogen, O, S, or N; and n ranges from 0 up to a valence of 3;
—$NO_2$, —CN, —$CO_2R$, -halogens, halogenated hydrocarbons, —$CF_3$, —COH, —$SO_3R$, —$NH_{3-n}R_n$, —$O_2CR$, amide, —OR, —$NH_{2-m}R_m$, and saturated or unsaturated linear, branched, cyclic or aromatic alkyl groups, wherein R and n are as defined above, and m ranges from 0 to 2; and combinations thereof.

* * * * *